Patented Feb. 26, 1935

1,992,916

UNITED STATES PATENT OFFICE 1,992,916

PERMEABLE CERAMIC MATERIAL AND PROCESS OF MAKING THE SAME

Hilding E. Johnson, Plainfield, N. J., assignor to Johns-Manville Corporation, New York, N. Y., a corporation of New York No Drawing. Application August 17, 1931, Serial No. 557,741

14 Claims. (Cl. 25—156)

This invention relates to permeable ceramic material and process for making the same, more particularly to a material adapted to absorb sound and containing intercommunicating cellular spaces.

An object of the invention is to provide means of controlling the size of pores or cellular spaces in a plastic mass that is to be molded and fired. Another object is to produce a ceramic material with surface pores communicating with inner pores, to give permeability. A further object is to provide a light weight material especially suitable for use in absorbing sound. Other objects will appear from the detailed description which follows.

In an acoustical material, i. e., a material used to absorb sound, certain properties are desirable. For example, the material should be permanent, vermin-proof, readily cleanable, and efficient in sound absorption. Factors which are important in sound absorption are the degree of porosity, the size of the individual pores, and the depth to which the surface pores extend inwardly into the material. Pores which are individually isolated and enclosed on all sides by rigid walls are not as satisfactory in sound absorption as pores which are intercommunicating. Thus, the effectiveness of an acoustical material may be judged partly from the specific permeability, by which is meant the amount of air, in cubic centimeters, that may be passed through the material per square centimeter of area, per second, at a pressure corresponding to one centimeter of water, at 70° F., when the material has a thickness of one centimeter. Porosity is expressed as the percentage of the total volume of the material which is void.

Porous ceramic materials are especially well adapted to meet some of the above requirements for a satisfactory acoustical material. However, the pores in such ceramic ware are usually noncommunicating and too large in size and unsatisfactory, therefore, in sound absorption.

The introduction of pores into compositions to be made into ceramic material has been accomplished by what may be described as "gasbloating". For example, in one process known heretofore a gas is generated by interaction of a carbonate of a metal with an acidic substance in a plastic mixture containing plaster of Paris, clay, or other material adapted to set on standing or to develop a bond on firing. Such a process produces a porous product with cells which to a great extent are individually sealed in envelopes of solid material. Also, because of coalescence, these pores or cells may be larger than the gas bubbles first formed. To produce small pores by this process requires the use of either small proportions of gas generating materials or a relatively stiff paste at the time of generation of gas, in order to decrease coalescence. Both of these expedients operate to give a rather heavy or dense product, with pores largely non-communicating, as before.

It has now been discovered that the desired pore structure may be obtained by admixture of a comminuted combustible material, suitably of an apparent density less than that of water, with the plastic clay, plaster, and gas-evolving reagents, drying, and firing the product. Soft wood sawdust through 20 mesh is an example of such a medium for controlling the properties of the pores. As a specific illustration of the difference which the addition of sawdust makes in the properties of the finished product, the following examples are given. In these the procedure is the same in each case, the sequence of operations being (1) admixture of the comminuted combustible material with the ground-dry clay, plaster of Paris, and gas-generating reagent, (2) addition of the mixture to the given proportion of liquid with rapid stirring, as, for example, in a revolving knife mixing machine, (3) shaping or molding, as by casting of the resultant plastic slip into molds coated with water-repellant material where the slip rises like bread, because of the gas evolution, (4) removing from the mold after hardening, (5) drying, and (6) firing till a ceramic bond is produced. In the examples for which data are given in the following tables, the temperature of the wet mixture was 125° F.; and the time and temperature of firing in a ceramic kiln, 8 hours at 2200° F. Except as noted, the preparations were made in comparable manner, some with sawdust in accordance with the invention, and some without.

Example I—With Sawdust

| | Parts by weight |
|---|---|
| Dry materials— | |
| Flint fire clay | 600 |
| Siliceous filler clay | 550 |
| Plastic retort clay | 550 |
| Plaster of Paris | 250 |
| Dolomite (through 60 mesh) | 80 |
| Sawdust (through 20 mesh) | 400 |
| Wet materials— | |
| Conc. sulfuric acid | 23.4 |
| Water | 1,800 |

*Physical properties of product after firing*

| | |
|---|---|
| Density, lbs./cu. ft. | 24.9 |
| Percent porosity | 85.9 |
| Specific permeability | 1.8 |
| Average diameter pores | 1/32 inch, approximately |

Example II—Without Sawdust

| | Parts by weight |
|---|---|
| Dry materials— | |
| Flint fire clay | 600 |
| Siliceous filler clay | 350 |
| Plastic retort clay | 550 |
| Plaster of Paris | 250 |
| Dolomite (through 60 mesh) | 125 |
| Wet materials— | |
| Water | 1,400 |
| Conc. sulfuric acid | 34.2 |

*Note.*—Dolomite and acid were increased and water decreased to give product of lower density than in Example No. I.

*Physical properties of product after firing*

| | |
|---|---|
| Density, lbs./cu. ft. | 22.9 |
| Percent porosity | 87.5 |
| Specific permeability | 0.15 |
| Average diameter pores | 1/8 inch, approximately |

Example III—With Sawdust

| | Parts by weight |
|---|---|
| Dry materials— | |
| Flint fire clay | 600 |
| Siliceous filler clay | 550 |
| Plastic retort clay | 350 |
| Plaster of Paris | 250 |
| Whiting | 80 |
| Alum | 80 |
| Sawdust (through 20 mesh) | 400 |
| Wet materials— | |
| Water | 2,025 |

*Physical properties of product after firing*

| | |
|---|---|
| Density, lbs./cu. ft. | 26.7 |
| Percent porosity | 86.0 |
| Specific permeability | 4.8 |
| Average diameter pores | Less than 1/32 inch |

Example IV—Without Sawdust

| | Parts by weight |
|---|---|
| Dry materials— | |
| Flint fire clay | 600 |
| Siliceous filler clay | 350 |
| Plastic retort clay | 550 |
| Plaster of Paris | 250 |
| Whiting | 80 |
| Alum | 80 |
| Wet materials— | |
| Water | 1,700 |

*Physical properties of product after firing*

| | |
|---|---|
| Density, lbs./cu. ft. | 38.6 |
| Percent porosity | 78.4 |
| Specific permeability | 0.70 |
| Average diameter pores | 1/32 inch, approximately |

The procedure using sawdust produces a product of specific permeability greater than 1.

Many variations from the specific examples given may be made without departing from the spirit of the invention.

Thus, other pore controlling media may be used. In general, the controlling medium, i. e., the material added to decrease the coalescence of the bubbles and also to cause the bubbles to become intercommunicating during the firing operation, should be a material that is readily penetrated or wetted by water and is combustible. There has been used satisfactorily comminuted organic material, particularly comminuted cellulosic material, of which an example is soft wood sawdust of such fineness as to pass through a 20-mesh screen. Examples of a comminuted combustible substance other than fine sawdust, that have been used with success, include animal hair, jute fibre, ground cork, ground peanut shells, or similar light weight comminuted organic materials. Fibrous materials such as hair or fibre may be used in lesser amount than granular or splintery materials such as cork or sawdust. For example, 30 parts by weight of animal hair may be substituted for 400 of sawdust.

The use of fibrous substances in small units, such as cotton linters, as the pore controlling media, produces pores that are relatively small.

The proportion of combustible material to be used may be varied within limits. When sawdust that has been passed through a 20-mesh screen is used, the amount may be 10 to 25 parts, suitably 15 to 20 parts, by weight of the sawdust to 100 parts of total dry materials going into the mixture. However, a lesser effect on the finished product may be obtained with a smaller amount of sawdust, whereas an amount of sawdust in excess of 25 parts to 100 parts of total dry mixture tends to make the finished product after firing too weak.

As materials for generating gas, there has been used satisfactorily water-insoluble carbonates of metals, such as precipitated calcium carbonate (whiting), Iceland spar, ground clam shells, or a mixture of magnesium and calcium carbonate, such as finely divided or pulverized dolomite. With acids or acidic substances, these carbonates will develop gas readily at low temperatures, say at 110 to 160° F., in distinction from certain organic fillers that develop gas only at much higher temperatures, or even at temperatures of firing. When the carbonate and acidic substance are well mixed with the organic controlling medium, the gas will be generated in intimate association with the comminuted combustible particles. The carbonate is used preferably in excess of the amount required to react with all of the acidic substance. Hydrogen gas generating powder may be used in place of carbon dioxide generating reagents, as for example, aluminum powder and water. Thus, 5% aluminum powder with 10% sawdust, 30% Portland cement and 59.5% clay, made into a paste with water, may be used.

Various clays or argillaceous materials, such as shale, other clays, or mixtures of clays may be substituted for the particular clays used in the examples. In general, the clay or clay mixture used should be one which will rise properly during the gas generation, prevent bubbles on the surface from escaping or causing blisters, minimize coalescence of the bubbles within the plastic mass, and develop the desired ceramic bond with a minimum of cracking and distortion during firing. The examples show the use of three different clays in such mixtures. These three clays may be replaced by a single clay of the type known as Somerset (New Jersey) clay, Mertztown (New Jersey) clay, or equivalent material.

In the examples, plaster of Paris (calcined gypsum) is used as a quick-setting agent or hydraulic setting agent which gives some strength to the shaped or molded article after a few minutes.

Quick-setting hydraulic high alumina cement (so-called "Lumnite cement") may be used for the same purpose. Plaster has been used in the proportion of 5 to 20% of the total mix, the best proportion depending in part upon the character of the mix.

To react with the carbonate and develop gas, there is used an acidic substance such as sulphuric acid or paper-maker's alum, the latter being in reality an incompletely dehydrated, solid aluminum sulphate.

The proportion of water used in making the mixture has an important effect. In general, the proportion of water to other ingredients should be such as to provide a plastic slip. When too much water is used, the setting is delayed, the set mass is too weak for handling, or the cast mass may slump, either before setting or after removal from the mold. When an inadequate quantity of water is used, the mass is too stiff to rise or to be cast into molds satisfactorily and also the finished product is relatively dense.

The plaster of Paris and other salts, as, for example, magnesium sulphate, if the gas has been generated by the use of magnesium carbonate with alum or sulphuric acid, and/or salts in the ash of the sawdust, may react with the aluminum silicate in the clay, during firing.

After being fired, the article may be sized and any irregularities of surface or any undesired surface layer may be removed, as with an emery cutting wheel.

Products made according to my process have been found to be very satisfactory for the purpose of sound absorption, and in particular for use as acoustical wall tile. Material made in accordance with Example I, for instance, has given a 67% efficiency with sound of 750 cycles frequency, in a standard absorption test by the Bureau of Standards reverberation method.

This invention is not limited to any theory or explanation of mode of operation. However, the following possible explanation may be of interest. The light-weight inert particles of combustible material, suspended through the viscous plastic clay mass, tend to hold the bubbles in situ as generated, because these particles of controlling medium block or restrict the movement of the bubbles. After the bloating in the plastic material has taken place and the plaster has set, the particles constitute an inert non-plastic aggregate which assists the plaster in supporting the plastic clay until the piece is dried. After drying, the presence of the solid aggregate in the fragile clay gives a much stronger piece to handle and one with less shrinkage in drying than if the combustible particles were not used. Then, when the article is fired, the combustible material develops gases, burns out, and opens up passages through the walls between the gas pores, to create overall permeability through the material. Many of these passages are extremely small capillaries.

Gases developed as a result of heating the combustible particles probably contribute considerably to imparting the desired degree of intercommunication of the pores due to their disruptive effect upon the cell walls, particularly since these gases are generated before the product becomes ceramically bonded. Light weight particles produce superior results, probably because they are more effective in preventing excessive coalescence and are more readily burned out. For this reason light weight organic and particular vegetable or cellulosic substances are preferred. The gases developed during the destruction of the particles escape of necessity from the article, and in so doing, produce gas escape channels connecting voids within the article with an exterior surface thereof.

While the foregoing description is confined largely to the production of products wherein the essential body of the product is of clay or of a ceramic character, and wherein the desired increase in permeability and porosity is secured by admixing a combustible (heat-destructible) material and thereafter removing it by burning, certain broader aspects of the invention are capable of wider application. For example, the clay might be replaced entirely by a cementing material such as Portland cement, and the combustible material burned out after a preliminary "bloating" and hardening of the product as before, or in place of the combustible material mentioned some other separable material, such as finely divided particles of naphthalene, removable either by burning, volatilization or by immersing the product in a suitable solvent, may be employed.

What I claim is:

1. A method of manufacturing porous ceramic products which comprises mixing argillaceous material, a gas-evolving agent, a comminuted combustible substance, and water to form a plastic slip, permitting the evolution of bubbles of gas throughout the mixture while in a fluid state, drying the resulting mass, and subjecting the dried mass to a high temperature adapted to burn out the admixed combustible matter and develop a ceramic bond in the said mass.

2. A method of manufacturing porous ceramic products which comprises mixing clay, a gas-evolving agent, a fibrous comminuted organic substance, and water to form a plastic slip, permitting the evolution of bubbles of gas throughout the mixture while in a fluid state, shaping the resulting porous mass, drying the resulting shaped mass, and subjecting the dried mass to a high temperature adapted to burn out the admixed organic matter and develop a ceramic bond in the said mass.

3. A method of manufacturing porous ceramic products which comprises mixing clay, a gas-evolving agent, a light weight water-wettable comminuted organic substance having a specific gravity less than one, and water to form a plastic slip, permitting the evolution of bubbles of gas throughout the mixture while in a fluid state, shaping the resulting porous mass, drying the resulting shaped mass, and subjecting the dried mass to a high temperature adapted to burn out the admixed organic matter and develop a ceramic bond in the said mass.

4. A method of manufacturing porous ceramic products which comprises mixing clay, a gas-evolving agent, sawdust in amount not in excess of about 20 per cent by weight of the total weight of dry constituents contained in the admixture, and water to form a plastic slip, permitting the evolution of bubbles of gas throughout the mixture while in a fluid state, shaping the resulting porous mass, drying the resulting shaped mass, and subjecting the dried mass to a high temperature adapted to burn out the admixed sawdust and develop a ceramic bond in the said mass.

5. A method of manufacturing porous ceramic products which comprises mixing argillaceous material, a quick-setting cementitious material, a gas-evolving agent, a comminuted organic material, and water to form a plastic slip, permitting the evolution of bubbles of gas throughout the mixture while in a fluid state, hardening the resulting porous mass by setting of the cementitious material, drying the resulting hardened mass, and subjecting the dried mass to a high temperature adapted to burn out the admixed organic matter and develop a ceramic bond in the said mass.

6. A method of manufacturing porous ceramic products which comprises mixing clay, a gas-evolving agent, a light weight comminuted cellulosic substance, and water to form a plastic slip, permitting the evolution of bubbles of gas throughout the mixture while in a fluid state, shaping the resulting porous mass, drying the resulting shaped mass to a high temperature adapted to burn out the admixed cellulosic matter and develop a ceramic bond in the said mass.

7. A method of manufacturing porous ceramic products which comprises mixing clay, a light weight comminuted combustible material, calcined gypsum, a gas-evolving agent comprising a water-insoluble carbonate and an acidic material, and water to form a plastic slip, the clay being present in said mixture in major amount and the calcined gypsum in minor amount, casting the mixture into molds, evolving bubbles of gas throughout the cast mixture while fluid and permitting the resulting porous mass to harden, drying the hardened cast shapes, and then subjecting them to a heat treatment at a high temperature adapted to burn out the admixed combustible material and ceramically bond the said shapes.

8. The method of preparing porous products which comprises forming a fluid mixture of body material, a gas-evolving agent, and finely divided solid particles adapted to reduce substantially the tendency of evolved gas bubbles to coalesce into larger units, generating bubbles of gas throughout the mixture, and thereafter firing the mixture to produce a rigid, porous product.

9. The method of preparing porous products which comprises forming a fluid mixture of body material, a gas-evolving agent, and finely divided solid particles of separable material adapted to reduce substantially the tendency of evolved gas bubbles to coalesce into larger units, generating bubbles of gas throughout the mixture, thereafter hardening the mixture to produce a rigid, porous product, and then removing the said particles therefrom, to increase the porosity and permeability of the product.

10. A sound-absorbing shaped ceramic article provided with voids corresponding to gas bubbles present during shaping of the article and gas escape channels connecting the said voids with an exterior surface of the article.

11. A sound absorbing shaped ceramic article provided with voids corresponding to gas bubbles generated in situ, prior to shaping of the article, and gas escape channels connecting the said voids with an exterior surface of the article.

12. A sound-absorbing shaped ceramic article provided with voids corresponding to gas bubbles generated in situ, prior to shaping of the article, and gas escape channels connecting the said voids with an exterior surface of the article and formed subsequent to the shaping of the article.

13. The method of preparing porous products which comprises forming a fluid mixture of body material, a gas-evolving agent, and finely divided solid particles adapted to reduce substantially the tendency of evolved gas bubbles to coalesce into larger units, generating bubbles of gas throughout the mixture, and thereafter drying and firing the mixture to produce a rigid, porous ceramically bonded product.

14. The method of preparing porous products which comprises forming a fluid mixture of body material, a gas-evolving agent, and finely divided solid particles of separable material of the type of naphthalene, generating bubbles of gas throughout the mixture, removing the said particles therefrom, to increase the porosity and permeability of the product, and hardening the resulting porous mass.

HILDING E. JOHNSON.